United States Patent
McPartland

(10) Patent No.: US 7,083,555 B1
(45) Date of Patent: Aug. 1, 2006

(54) ABDOMINAL EXERCISE DEVICE FOR USE BY A PERSON SITTING IN AN AUTOMOBILE SEAT AND DOING CRUNCHES

(76) Inventor: Michael McPartland, 110 W. Lively Ct., Cary, NC (US) 27511

(*) Notice: Subject to any disclaimer, the term of this patent is extended or adjusted under 35 U.S.C. 154(b) by 22 days.

(21) Appl. No.: 10/354,221

(22) Filed: Jan. 29, 2003

(51) Int. Cl.
*A63B 26/00* (2006.01)
*A63B 71/00* (2006.01)

(52) U.S. Cl. ............ 482/140; 482/907; 482/148; 297/464

(58) Field of Classification Search ........ 482/121–130, 482/139–140, 907–908, 125, 102–103; 180/271, 180/268, 166; 297/250.1, 464; 280/801.1; D6/334; 296/63; 224/155
See application file for complete search history.

(56) References Cited

U.S. PATENT DOCUMENTS

| | | | | |
|---|---|---|---|---|
| 894,052 A | * | 7/1908 | Radtke | 297/471 |
| 2,871,927 A | * | 2/1959 | Materi | 297/471 |
| 4,850,637 A | * | 7/1989 | Carlino | 296/180.1 |
| 4,913,423 A | * | 4/1990 | Farran et al. | 482/130 |
| 4,921,247 A | * | 5/1990 | Sterling | 482/138 |
| 5,069,449 A | * | 12/1991 | Wardwell | 279/139 |
| 5,141,482 A | | 8/1992 | Hern | |
| 5,733,014 A | * | 3/1998 | Murray | 297/485 |
| 5,743,838 A | * | 4/1998 | Willis | 482/124 |
| 5,769,764 A | * | 6/1998 | Tilberis | 482/124 |
| 5,971,900 A | * | 10/1999 | Miller | 482/140 |
| 6,013,014 A | * | 1/2000 | Hern | 482/121 |
| 6,063,012 A | * | 5/2000 | Berkowitz et al. | 482/121 |
| 6,159,133 A | | 12/2000 | Shugg | |
| 6,183,403 B1 | * | 2/2001 | Dunn | 482/121 |
| 6,319,180 B1 | * | 11/2001 | Kallassy | 482/140 |
| 6,500,103 B1 | * | 12/2002 | Porter | 482/121 |
| 6,500,104 B1 | * | 12/2002 | Rich | 482/123 |

* cited by examiner

*Primary Examiner*—Lori Amerson
(74) *Attorney, Agent, or Firm*—Mills Law Firm PLLC

(57) ABSTRACT

An abdominal exercise device for use by a person sitting in an automobile seat and doing crunches. An automobile seat-engaging member engages either the back or the head rest of the automobile seat. An elastic resistance strap extends through the automobile seat-engaging member and forward thereof to be gripped by the person sitting in the automobile seat so as to add resistance as the person sitting in the automobile seat does the crunches. The elastic resistance strap enters the automobile seat-engaging member from close to one end, and leaving an exposed portion thereof extending out of the automobile seat-engaging member extends through the automobile seat-engaging member, and exits the automobile seat-engaging member from close to the other end thereof and leaving another exposed portion thereof extending out of the automobile seat-engaging member.

2 Claims, 1 Drawing Sheet

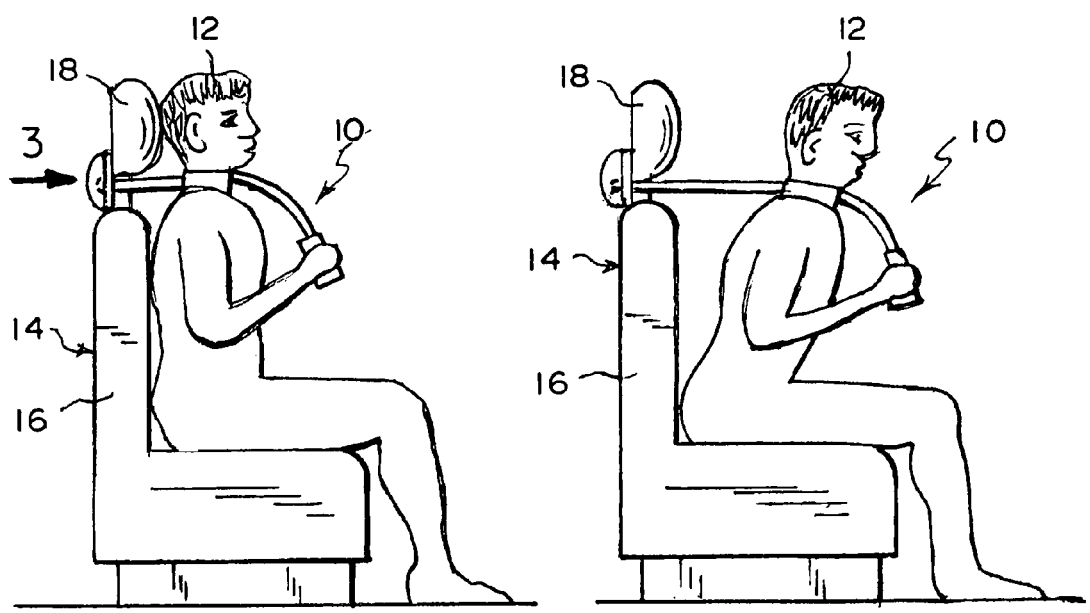
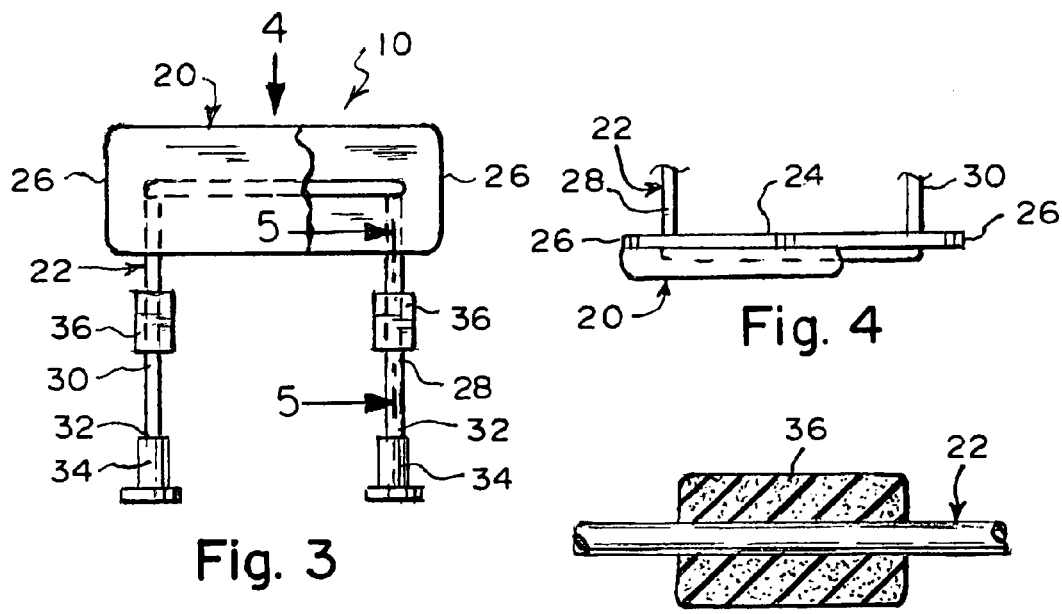

ABDOMINAL EXERCISE DEVICE FOR USE BY A PERSON SITTING IN AN AUTOMOBILE SEAT AND DOING CRUNCHES

BACKGROUND OF THE INVENTION

1. Field of the Invention

The present invention relates to an abdominal exercise device. More particularly, the present invention relates to an abdominal exercise device for use by a person sitting in an automobile seat and doing crunches.

2. Description of the Prior Art

Numerous innovations for automobile exercise devices have been provided in the prior art that will be described. Even though these innovations may be suitable for the specific individual purposes to which they address, however, they differ from the present invention.

A FIRST EXAMPLE U.S. Pat. No. 5,141,482 to Hern teaches an exercise device to be used by a person sitting in a seat that includes an adjustable length strap with a friction buckle for firm attachment to a seat of variable sizes. A chest strap with an adjustable length fits around the chest of an exerciser and is connected to the seat strap via a pair of self-retracting elastic cords. A pair of adjustable length shoulder straps clamp on the chest strap to inhibit its downward movement when the exerciser moves forwardly against the tension of the elastic cords and/or tightens the stomach muscles when performing an exercise.

A SECOND EXAMPLE U.S. Pat. No. 6,063,012 to Berkowitz et al. teaches a portable exercise device that uses a single centrally located bungee to provide equal tension on both sides of a user's back. A seat attachment strap secures the device to a seat back. In one embodiment, an optional pad worn by the user is secured to a tension strap which is attached at its ends to the bungee. The tension strap is held in place on the seat attachment strap by retaining straps mounted on the seat attachment strap. To exercise the abdominal muscles, the user leans forward causing the single tension cord to exert equal pressure on the side straps thereby exercising the abdominal muscles. By reversing position, the user may exercise back muscles by leaning backward, or exercise chest and arm muscles by pushing against the seat back with the user's arms. An alternative embodiment uses a chest strap that is centrally attached to the tension strap by a centrally located attachment strap. Another alternative embodiment attaches the tension strap directly to the chest strap. Yet another embodiment attaches the bungee directly to the seat attachment belt and chest strap, eliminating the tension straps. In this embodiment, the tension cord is centrally attached between the user and the seat back. The exercise device can also be used in conjunction with push-up handles to exercise the user's arms and chest.

A THIRD EXAMPLE U.S. Pat. No. 6,159,133 to Shugg teaches a seat mounted workout station system including a seating assembly having a seat portion and a back portion. Also included is a frame mounted on a rear surface of the back portion of the seating assembly. Next provided is a plurality of tension members connected to the frame and further connected to cables which are routed through the frame via pulleys. Hand grips are connected to the cables for being gripped by a user.

A FOURTH EXAMPLE U.S. Pat. No. 6,183,403 to Dunn teaches an exercise system for use in an automobile or other vehicle comprising a generally flat, elongate door jamb member, a generally flat, elongate seat attachment member and at least one resilient tension member. The door jamb member includes an enlarged portion, with a thickness greater than the distance between the vehicle door and the vehicle door frame when the vehicle door is closed, on a first end zone of the door jamb member so as to prevent the first end zone from being pulled between the vehicle door and the vehicle door frame when the vehicle door is closed, and a magnetic pad on the outer end of the first end zone of the door jamb member structured and disposed to removably secure the outer end of the first end zone of the door jamb member to the vehicle roof. The seat attachment member includes a buckle, structured to secure a first end of the seat attachment member to the second opposite end of the seat attachment member, thereby securing the seat attachment member around the vehicle seat. Each tension member includes a handle at one end and is removably attached to the door jamb member or seat attachment member at the opposite end.

It is apparent that numerous innovations for automobile exercise devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an abdominal exercise device for use by a person sitting in an automobile seat and doing crunches that avoids the disadvantages of the prior art.

ANOTHER OBJECT of the present invention is to provide an abdominal exercise device for use by a person sitting in an automobile seat and doing crunches that is simple and inexpensive to manufacture.

STILL ANOTHER OBJECT of the present invention is to provide an abdominal exercise device for use by a person sitting in an automobile seat and doing crunches that is simple to use.

BRIEFLY STATED, STILL YET ANOTHER OBJECT of the present invention is to provide an abdominal exercise device for use by a person sitting in an automobile seat and doing crunches. An automobile seat-engaging member engages either the back or the head rest of the automobile seat. An elastic resistance strap extends through the automobile seat-engaging member and forward thereof to be gripped by the person sitting in the automobile seat so as to add resistance as the person sitting in the automobile seat does the crunches. The elastic resistance strap enters the automobile seat-engaging member from close to one end, and leaving an exposed portion thereof extending out of the automobile seat-engaging member extends through the automobile seat-engaging member, and exits the automobile seat-engaging member from close to the other end thereof and leaving another exposed portion thereof extending out of the automobile seat-engaging member.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic side elevational view of a user with the present invention prior to use;

FIG. 2 is a diagrammatic side elevational view of a user with the present invention in use;

FIG. 3 is an enlarged diagrammatic rear view, with parts broken away, taken in the direction of arrow 3 in FIG. 1 of the present invention per se;

FIG. 4 is a diagrammatic top view taken generally in the direction of arrow 4 in FIG. 3; and FIG. 5 is an enlarged diagrammatic cross sectional view taken along line 5—5 in FIG. 3 of a shoulder pad.

LIST OF REFERENCE NUMERALS UTILIZED IN THE DRAWING 10 abdominal exercise device of present invention for use by person 12 sitting in automobile seat 14 and doing crunches
12 person sitting in automobile seat 14 and doing crunches
14 automobile seat
16 back of automobile seat 14
18 head rest of automobile seat 14
20 automobile seat-engaging member for engaging at least one of back 16 and head rest 18 of automobile seat 14
22 elastic resistance strap for gripping by person 12 sitting in automobile seat 14 so as to add resistance as person 12 sitting in automobile seat 14 does crunches
24 seat-engaging surface of automobile seat-engaging member 20
26 pair of ends of seat-engaging surface 24 of automobile seat-engaging member 20
28 exposed portion of elastic resistance strap 22
30 another exposed portion of elastic resistance strap 22
32 ends of exposed portion 28 and another exposed portion 30 of elastic resistance strap 22
34 hand grips
36 shoulder pads

DETAILED DESCRIPTION OF THE PREFERRED EMBODIMENT

Referring now to the figures, in which like numerals indicate like parts, and particularly to FIGS. 1 and 2, the abdominal exercise device of the present invention is shown generally at 10 for use by a person 12 sitting in an automobile seat 14 and doing crunches, wherein the automobile seat 14 has at least one of a back 16 and a head rest 18.

The configuration of the abdominal exercise device 10 can best be seen in FIGS. 3–5, and as such, will be discussed with reference thereto.

The abdominal exercise device 10 comprises an automobile seat-engaging member 20 and an elastic resistance strap 22. The automobile seat-engaging member 20 is for engaging at least one of the back 16 and the head rest 18 of the automobile seat 14. The elastic resistance strap 22 extends through the automobile seat-engaging member 20 and forward thereof for gripping by the person 12 sitting in the automobile seat 14 so as to add resistance as the person 12 sitting in the automobile seat 14 does the crunches.

The automobile seat-engaging member 20 is generally planar and has a seat-engaging surface 24 with a pair of ends 26. The elastic resistance strap 22 enters the automobile seat-engaging member 20 from close to one end 26 of the seat-engaging surface 24, and leaving an exposed portion 28 thereof extending out of the automobile seat-engaging member 20 extends through the automobile seat-engaging member 20, and exits the automobile seat-engaging member 20 from close to the other end 26 of the seat-engaging surface 24 and leaving another exposed portion 30 thereof extending out of the automobile seat-engaging member 20.

The exposed portion 28 and the another exposed portion 30 of the elastic resistance strap 22 terminate in ends 32.

The abdominal exercise device 10 further comprises hand grips 34. The hand grips 34 are disposed on the ends 32 of the elastic resistance strap 22.

The abdominal exercise device 10 further comprises shoulder pads 36. The shoulder pads 36 are disposed around the exposed portion 28 and the another exposed portion 30 of the elastic resistance strap 22, respectively, approximately intermediately therealong.

It will be understood that each of the elements described above, or two or more together, may also find a useful application in other types of constructions differing from the types described above.

While the invention has been illustrated and described as embodied in an abdominal exercise device for use by a person sitting in an automobile seat and doing crunches, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An abdominal exercise device in conjunction with a seat assembly of a motor vehicle for a person sitting in said seat assembly wherein said seat assembly includes a head rest including support means for positioning above the top portion of the seat assembly, said abdominal device comprising:
   an engagement member for engaging a rear portion of said seat assembly, said engagement member having spaced end portions with apertures therein;
   a single elongated elastic member having a center portion engaging a rear surface of said engagement member, said elastic member having elastic strap members extending through said apertures and forwardly between said seat assembly and said head rest, said strap members having center sections extending over opposed shoulders of the person and terminating with hand grip means for gripping by the hands of the user, said strap members elastically yielding upon forward movement of the shoulders and the hands whereby the abdominal region of the person is exercised.

2. The abdominal exercise device as recited in claim 1 including shoulder pad means on said center sections of said strap members for engaging the shoulders of the person.

* * * * *